United States Patent [19]

Gregory

[11] Patent Number: 5,670,196
[45] Date of Patent: Sep. 23, 1997

[54] METHOD FOR MICROFILTRATION OF MILK OR COLOSTRAL WHEY

[75] Inventor: Antone G. Gregory, Vadnais Heights, Minn.

[73] Assignee: GalaGen Inc., Arden Hills, Minn.

[21] Appl. No.: 687,772

[22] Filed: Jul. 26, 1996

Related U.S. Application Data

[63] Continuation of Ser. No. 422,493, Apr. 12, 1995, abandoned.

[51] Int. Cl.$^6$ .................................................. A23C 7/04
[52] U.S. Cl. ..................... 426/580; 426/583; 426/422; 426/491; 426/495
[58] Field of Search ................................. 426/580, 583, 426/422, 478, 480, 491, 495

[56] References Cited

U.S. PATENT DOCUMENTS

| | | | |
|---|---|---|---|
| 1,766,590 | 6/1930 | Bauer. | |
| 2,607,716 | 8/1952 | Link | 167/53 |
| 2,669,559 | 2/1954 | Reid | 260/112 |
| 3,128,230 | 4/1964 | Heinbach | 167/78 |
| 3,234,199 | 2/1966 | Reid | 260/112 |
| 3,376,198 | 4/1968 | Petersen et al. | 167/78 |
| 3,553,317 | 1/1971 | Michaelson et al. | 424/87 |
| 3,646,193 | 2/1972 | Michaelson et al. | 424/85 |
| 3,687,682 | 8/1972 | Scheder | 99/57 |
| 3,687,928 | 8/1972 | Brouwer et al. | 260/122 |
| 3,896,241 | 7/1975 | Malaspina et al. | 426/271 |
| 3,911,108 | 10/1975 | Singh | 424/86 |
| 3,930,039 | 12/1975 | Kuipers | 426/271 |
| 3,969,336 | 7/1976 | Criswell | 260/112 R |
| 4,018,752 | 4/1977 | Buhler et al. | 260/112 R |
| 4,028,317 | 6/1977 | Chang | 260/122 R |
| 4,042,575 | 8/1977 | Eustache | 260/112 R |
| 4,042,576 | 8/1977 | Eustache | 260/112 R |
| 4,051,235 | 9/1977 | Plymate | 424/85 |
| 4,096,244 | 6/1978 | Newson et al. | 424/85 |
| 4,112,123 | 9/1978 | Roberts | 426/72 |
| 4,229,342 | 10/1980 | Mirabel | 260/120 |
| 4,265,924 | 5/1981 | Buhler et al. | 426/582 |
| 4,322,275 | 3/1982 | Jain | 204/180 P |
| 4,377,569 | 3/1983 | Plymate | 424/85 |
| 4,402,938 | 9/1983 | Collins et al. | 424/85 |
| 4,485,040 | 11/1984 | Roger et al. | 260/122 |
| 4,526,715 | 7/1985 | Kothe et al. | 260/112 B |
| 4,528,203 | 7/1985 | Harris et al. | 426/555 |
| 4,644,056 | 2/1987 | Kothe et al. | 530/387 |
| 4,816,252 | 3/1989 | Stott et al. | 424/85.8 |
| 4,834,974 | 5/1989 | Stott et al. | 424/85.8 |
| 4,911,910 | 3/1990 | Mifflin | 424/85.8 |
| 5,017,372 | 5/1991 | Hastings | 424/85.8 |
| 5,066,491 | 11/1991 | Stott et al. | 424/85.8 |
| 5,147,548 | 9/1992 | Hies et al. | 210/639 |
| 5,290,571 | 3/1994 | Bonnous et al. | 424/535 |
| 5,356,651 | 10/1994 | Oegan et al. | 426/491 |
| 5,370,793 | 12/1994 | Sugimoto | 210/195.1 |

FOREIGN PATENT DOCUMENTS

| | | |
|---|---|---|
| 8934171 | 11/1989 | Australia. |
| 63-135336 | 6/1988 | Japan. |
| 4-66050 | 3/1992 | Japan. |
| 1 202 979 | 8/1970 | United Kingdom. |
| 1 573 995 | 9/1980 | United Kingdom. |
| 2 126 236 | 3/1984 | United Kingdom. |

OTHER PUBLICATIONS

Passive Immunity to Bovine Rotavirus in Newborn Calves Fed Colostrum Supplements from Immunized or Nonimmunized Cows, Saif et al., Injection and Immunity, Sep. 1993, vol. 41, No. 3, pp. 1118–1131.

Treatment of Gastrointestinal Infections in Infants by Oral Administration of Colostral Antibodies, R.Lodinova–Zadnikova et al., Die Nahrung 31 (1987) 5–6, pp. 465–467.

Newborn Calf Intestinal Absorption of Immunoglobulins Extracted from Colostrum, J.F. Grongnet et al., Reprod. Nutr. Develop., 1986, 26 (2 B), 731–743.

Vaccination of Pregnant Cows With K99 Antigen of Enterotoxigenic *Escherichia coli* and Protection by Colostrum in Newborn Calves, C. Valente et al., Comp. Immun. Microbiol. Infect. Dis. vol. 11, No. 3/4, pp. 189–198, 1988.

Colostral Immunoglobulin Absorption Linearly Related to Concentration for Calves, G.H. Scott et al., Journal Paper 1433 of the Arizona Agricultural Experiment Station, 1983 J. Dairy Sci 66:1319–1328.

*Primary Examiner*—Anthony J. Weier
*Attorney, Agent, or Firm*—Merchant, Gould, Smith, Edell, Welter & Schmidt, P.A.

[57] ABSTRACT

A method of microfiltering milk, milk serum, colostrum, or colostral serum which provides effective bioburden reduction without substantial loss of immunoglobulins.

11 Claims, No Drawings

METHOD FOR MICROFILTRATION OF MILK OR COLOSTRAL WHEY

This is a Continuation of application Ser. No. 08/422,493, filed Apr. 12, 1995 now abandoned.

FIELD OF THE INVENTION

This invention relates to a method of microfiltering milk, milk serum, colostrum or colostral serum using charged depth filters and the production of whey products fortified with immunoglobulins.

BACKGROUND OF THE INVENTION

There have been a number of methods proposed in the prior art for the production of protein concentrates which contain immunological factors derived from mammalian milk or milk serum. These known methods have a number of drawbacks, ranging from low immunoglobulin yields to complicated and cumbersome process steps.

Great Britain Patent Specification 1,573,995, for example, describes a long complicated process for the production of a protein concentrate containing immunological factors of lactic origin from collected milk or colostrum that requires multiple separation and processing steps.

U.S. Pat. No. 4,644,056 is directed to a process for the preparation of a solution of lactic or colostric immunoglobulins through two cross-flow filtration steps. The first filtration takes place in a filtration unit with a mean pore size of 0.1-1.2 um and the second in a filtration unit having a limit of separation of 5,000-80,000 daltons.

U.S. Pat. No. 5,147,548 teaches the preparation of sterile filtered colostrum by adjusting the pH of the colostrum to less than 3.5 without first removing casein. The colostrum is then filtered at low pH or returned to its original pH and then filtered. The pH reduction with hydrochloric acid at elevated temperatures results in denaturing of the immunoglobulins found in the colostrum and immunoglobulin yields are low.

Although a number of processes have been developed for the production of protein concentrates containing immunological factors of lactic origin, there remains a need for a process which gives high yields of immunoglobulins with reduced bioburden levels.

SUMMARY OF THE INVENTION

A method of microfiltering milk serum, colostrum or colostral serum has been discovered which substantially reduces the bioburden in the product while providing high immunoglobulin yields. The method makes use of charged depth filters to provide consistent bioburden control, resulting in whey products fortified with immunoglobulins.

Fortified whey products may be prepared using the microfiltration process of the invention. Microfiltration is performed before ultrafiltration to reduce bioburden and eliminate the need for multiple sterile filtrations after ultrafiltration.

DETAILED DESCRIPTION OF THE INVENTION

The microfiltration of the instant invention can be performed using a charged depth filter and microfilter cartridge having a pore size sufficient to provide effective bioburden reduction, for example, about 0.1 to 2.0 microns. Examples of useful microfilters include the Seitz SWK-VELA disc, Cuno 12ZP and Cuno 12ZP1P housings. Useful filter cartridges include the Seitz Supra type, Cuno 30SP, Cuno 50SP and Cuno 90SP and the like. Of these filter housings and filter cartridges, the Cuno 12ZP housing and Cuno 30SP cartridges are preferred.

A filter aid can be used in the filtration process of the instant invention and will increase the filter capacity. Diatomaceous earth such as Dicalite 215 or Hyflo Supercell is the preferred filter aid. The filter aid is added to the solution to be filtered in an amount effective to increase the filter capacity to desired levels, such as about 4 g/l or 3.34 lbs/100 gal.

To enhance the distribution of a filter aid such as diatomaceous earth during the filtration process, filter housings such as the Cuno 12ZP may be modified. In particular, modification of the housing so that the feed port is at the top of the housing instead of the bottom helps provide a more uniform distribution of the filter aid.

Because immunoglobulins can be denatured by high temperatures, low pH, or a combination of these conditions, careful monitoring and control of temperature and pH levels at each step of the process is important. The process conditions, including temperature and pH of the product is controlled to maximize the efficiency of the microfiltration process and avoid denaturation of immunoglobulins.

The method of the invention for microfiltration of milk, milk serum, colostrum or colostral serum is carried out using milk, milk serum, colostrum or colostral serum from a mammal. Although it is not necessary, the mammal may be immunized or hyperimmunized against a preselected disease. A cow is the preferred mammal, but the milk or colostrum of any mammal may be used. Mammals whose milk or colostrum may be used in the process of the invention include goat, buffalo, water buffalo, yak, rabbit, human, llama and mouse. Because colostrum, a secretion of the mammary glands produced during the first few days after parturition, and colostral serum, has a higher immunoglobulin content than regular milk or milk serum, it is the preferred starting material for the production of protein concentrates fortified with immunoglobulins. Colostrum collected during the first three days after parturition is especially preferred. The milk, milk serum, colostrum or colostral serum may be frozen until sufficient quantities are collected to produce the desired amount of immunoglobulin fortified protein concentrate.

If frozen milk, milk serum, colostrum or colostral serum is used in the process of the invention, care should be taken that the heat applied to thaw the frozen milk, milk serum, colostrum or colostral serum does not cause immunoglobulin denaturation. The temperature is controlled to reduce the risk of heat denaturation while thawing the product. Preferably, the temperature of the water used to thaw the frozen milk, milk serum, colostrum or colostral serum should be no more than about 130° F. The final temperature of the thawed starting material is preferably about 110° F.

Cream or fat is separated from the milk, milk serum, colostrum, or colostral serum by centrifugation. After the initial separation, one may resuspend the fat and separate a second time to recover as much of the skim as possible. Temperature is not critical at this step, so long as there is no risk of immunoglobulin denaturation. A temperature range of about 75° to 110° F. is desirable.

Next the defatted milk, milk serum, colostrum or colostral serum is acidified to precipitate casein. To accomplish this, the pH is lowered from about 6.0 to about 4.5 to 4.7. Any acid can be used to lower the pH of the product, such as hydrochloric, phosphoric, lactic, and the like, with lactic acid the preferred agent. To avoid the development of localized low pH areas which may lead to immunoglobulin denaturation, the acid delivery rate should be fairly slow. Preferably, the acid delivery rate should be such that the pH is lowered by about 0.2 units every five minutes. After casein is precipitated it is removed, preferably by centrifugation.

The present invention envisions a single microfiltration step that can provide bioburden reduction of at least 4 logs relative to original levels without substantial loss of immunoglobulins. For the purposes of this invention, milk, milk serum, colostrum or colostral serum has suffered substantial loss of immunoglobulins if the product has less than about 90% of its original immunoglobulin content. By using the microfiltration method of the invention, immunoglobulin yields of about 90%, preferably greater than about 90% can be obtained.

The product is maintained at the acidified pH of about 4.5 to 4.7 through the microfiltration step to minimize bacterial growth. This microfiltration step is carried out at a temperature which is sufficiently low to retard the growth of bacteria in the milk serum or colostral serum to be filtered. Any temperature which will slow bacterial growth while allowing the product to be easily filtered is acceptable, but it is preferred that the filtration be carried out at a maximum temperature of about 50° F. This microfiltration reduces the bioburden in the product by at least about 4 logs. If further ultrafiltration is desired, this step allows for easier and more efficient ultrafiltration and reduces bacterial growth in the ultrafiltering membranes.

In a preferred embodiment, the microfilter is operated at a constant feed rate until the maximum transfilter pressure differential of about 40 psi is reached. This transfilter pressure differential is maintained by reducing the filter feed rate to prevent contaminant breakthrough.

After the microfiltration is complete the product, which has a substantially reduced bioburden content and immunoglobulin levels of about 95–100% relative to the starting material, can be further processed. For example, the immunoglobulins may be further concentrated or purified using methods known in the art.

The invention is illustrated by the following examples, which are not intended to limit the claimed invention in any way.

EXAMPLE 1

(a) Thawing of Frozen Colostrum

A continuous flow was established in a thawing vessel containing about 5 to 10 gallons of water having a temperature of 125° F. 300 gallons of frozen colostrum was separated from its containers and placed into the thawing vessel. The final temperature of the thawed colostrum was 72° F. and the final volume was 306 gal.

(b) Separation of Cream

The colostrum obtained in step (a) was warmed to a temperature of 85° F. Cream was separated from the skim by centrifugation, resulting in 275 gal. of skim and 25 gal. of cream. 50 gal. of water was added to the cream and it was reseparated at a temperature of 106° F. The second separation resulted in 75 gal. of skim and 18 gal. of cream. The first and second skim portions were combined, resulting in a total of 350 gal. of skim.

(c) Dilution and Acidification of Skim 525 gal. of water were added to the skim, for a total of 875 gal. of diluted skim. The skim was acidified to a pH of 4.60 using 51 gal. of dilute lactic acid. The final temperature was 111.8° F. The acidified skim was allowed to rest for 50 minutes. 235 lb. of curd was separated from the colostral supernatant by centrifugation and disposed. The colostral supernatant was cooled to 45° F. and held overnight.

(d) Microfiltration 31.1 lb. of diatomaceous earth was added to the cold acidified supernatant and agitated for 25 min. The supernatant was microfiltered using a Cuno 12ZP microfilter modified for top feed and containing Cuno 30SP cartridges totaling 28 square feet. 925 gal. of supernatant were recovered and the temperature of the supernatant was 42° F.

(e) Results

The immunoglobulin recovery across this microfiltration was 97% relative to original levels. A single radial immunodiffusion (RID) method was used to measure concentrations of bovine immunoglobulin (IgG) contained in processing fractions. The RID method results in a precipitation ring surrounding a well in which a bovine IgG sample was placed. Briefly, the precipitation occurs in a gel containing a constant amount of antibody reactive with bovine IgG. The size of the precipitation is relative to the quantity of bovine IgG contained in the sample. Using the method for determining standard plate count described in *Standard Methods for the Examination of Dairy Products*, total plate count was measured before and after the microfiltration step. The total plate count was reduced from $6.0 \times 10^5$ cfu/ml to $1.1 \times 10^1$ cfu/ml, or by 4.7 logs.

I claim:

1. A method of preparing a whey product fortified with immunoglobulins comprising the steps of:
   (a) Collecting milk or milk serum from a mammal;
   (b) Centrifuging the milk or milk serum to remove fat;
   (c) Acidifying the remaining skim milk or milk serum to precipitate casein from the milk or milk serum, followed by removal of the casein by centrifugation; and
   (d) Microfiltering the supernatant milk or milk serum using a charged depth filter to reduce bioburden with immunoglobulin recovery of about 90% or greater.

2. The method of claim 1 wherein the mammal is immunized or hyperimmunized before the collection of milk or milk serum.

3. A method according to claim 1 wherein the skim is acidified in step (c) to a pH of about 4.5 to 4.7.

4. A method according to claim 1 wherein the microfiltration of step (d) is performed at a maximum temperature of about 50° F.

5. A method according to claim 1 wherein a filter aid is employed in microfiltration step (d).

6. A method according to claim 1 wherein the mammalian milk serum, colostrum or colostral serum is obtained from a mammal selected from the group consisting of cow, goat, buffalo, water buffalo, llama, rabbit, human, yak and mouse.

7. A method according to claim 1 wherein the feed port of the filter housing is at the top of the housing.

8. A method of microfiltration of mammalian milk serum, colostrum, or colostral serum, comprising adjusting the pH of the milk serum, colostrum or colostral serum to about 4.0 to 6.5 and then microfiltering the milk serum, colostrum or colostral serum using a charged depth filter, wherein the bioburden of the milk serum, colostrum or colostral serum is reduced by at least about 4 log with immunoglobulin recovery of about 90%.

9. A method according to claim 8 wherein a filter aid is used.

10. A method according to claim 8 wherein the feed port of the filter housing is at the top of the housing.

11. A method according to claim 8 wherein the mammalian milk serum, colostrum or colostral serum is obtained from a mammal selected from the group consisting of cow, goat, buffalo, water buffalo, llama, rabbit, human, yak and mouse.

* * * * *